United States Patent
Jung et al.

(10) Patent No.: US 7,985,954 B2
(45) Date of Patent: Jul. 26, 2011

(54) X-RAY DETECTION PANEL AND X-RAY DETECTOR

(75) Inventors: Kwan-Wook Jung, Suwon-si (KR); Dae-Ho Choo, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 64 days.

(21) Appl. No.: 12/536,989

(22) Filed: Aug. 6, 2009

(65) Prior Publication Data

US 2010/0051819 A1    Mar. 4, 2010

(30) Foreign Application Priority Data

Aug. 29, 2008    (KR) .................. 10-2008-0085246

(51) Int. Cl.
*G01T 1/24* (2006.01)
(52) U.S. Cl. ................................. 250/370.09
(58) Field of Classification Search ............. 250/370.09; 378/91, 98.8
See application file for complete search history.

(56) References Cited

U.S. PATENT DOCUMENTS

| | | | |
|---|---|---|---|
| 5,352,884 A | 10/1994 | Petrick et al. | |
| 2005/0254624 A1* | 11/2005 | Kautzer et al. | 378/91 |
| 2006/0132425 A1* | 6/2006 | Kim et al. | 345/104 |
| 2006/0289769 A1* | 12/2006 | Yagi et al. | 250/362 |
| 2007/0007458 A1* | 1/2007 | Mochizuki et al. | 250/370.09 |
| 2007/0069111 A1 | 3/2007 | Spahn | |

FOREIGN PATENT DOCUMENTS

| | | |
|---|---|---|
| JP | 2003-57678 | 3/2003 |
| KR | 10-0278479 | 10/2000 |
| KR | 10-2004-0050946 | 6/2004 |
| KR | 10-2005-0112652 | 12/2005 |
| KR | 10-0604271 | 7/2006 |
| KR | 10-0654774 | 11/2006 |
| KR | 10-2006-0130860 | 12/2006 |

OTHER PUBLICATIONS

English Abstract for Publication No. JP2003057678.
English Abstract for Publication No. 1020020030227.
English Abstract for Publication No. 1020040050946.
English Abstract for Publication No. 1020050112652.
English Abstract for Publication No. 1020010094907.
English Abstract for Publication No. 1020060130860.
English Abstract for Publication No. 1020000024968.

* cited by examiner

*Primary Examiner* — David P Porta
*Assistant Examiner* — Marcus H Taningco
(74) *Attorney, Agent, or Firm* — F. Chau & Associates, LLC

(57) ABSTRACT

An X-ray detector includes a plurality of bias connection lines that connect both ends, respectively, of a bias line for applying a bias voltage to a PIN diode. The bias line includes first and second bias lines.

15 Claims, 8 Drawing Sheets

X-RAY DETECTION PANEL AND X-RAY DETECTOR

CROSS-REFERENCE TO RELATED APPLICATION

This application claims priority to and the benefit of Korean Patent Application No. 10-2008-0085246 filed in the Korean Intellectual Property Office on Aug. 29, 2008, the entire contents of which are herein incorporated by reference.

BACKGROUND OF THE INVENTION (a) Field of the Invention

The present invention relates to an X-ray detection panel and an X-ray detector.

(b) Description of Related Art

In the field of radiography X-rays are typically detected using a separate film. In a method using separate films, X-rays should be radiated to a subject that does not move, and a new film should be used for each image. Accordingly, a cost is incurred whenever X-rays are radiated.

X-rays may also be detected using a charge-coupled device (CCD) or a complementary metal-oxide semiconductor (CMOS). Due to the small size of a detector that is formed with the CCD or the CMOS, after X-rays are detected, the image needs to be magnified.

The above information disclosed in this Background section is only for enhancement of understanding of the background of the invention and therefore it may contain information that does not form the prior art that is already known in this country to a person of ordinary skill in the art.

SUMMARY OF THE INVENTION

According to an exemplary embodiment of the present invention an X-ray detection panel includes a substrate, a plurality of gate lines that are extended on the substrate in a first direction, a plurality of data lines that are extended on the substrate in a second direction and that are insulated from and intersect the gate lines, a plurality of bias lines that are extended on the substrate in the second direction and that are insulated from and intersect the gate lines and that are substantially parallel to the data lines, a detection unit region that is partitioned by the gate lines and the data lines, the detection unit region comprising a thin film transistor (TFT) and a photosensor, a plurality of bias connection lines connected to both ends, respectively, of the plurality of bias lines to apply a bias voltage, and a scintillator adapted to convert X-rays to light of a visible wavelength.

The bias lines may include a first bias line and a second bias line that is formed on the first bias line.

The first bias line may be made of a transparent conductive material, and the second bias line may be made of a low resistance material.

The photosensor may be a PIN diode.

According to an embodiment of the present invention an X-ray detection panel includes a substrate, a plurality of gate lines formed on the substrate and including a gate electrode, a gate insulating layer covering the gate lines, a semiconductor formed on the gate insulating layer and the gate electrode, a plurality of data lines intersecting the gate lines and including a source electrode covering a portion of the semiconductor, a lower electrode including a drain electrode disposed opposite to the source electrode and extending from the drain electrode, a diode semiconductor formed on the lower electrode; an upper electrode formed on the diode semiconductor and made of a transparent conductive material, a passivation layer covering the upper electrode and having a contact hole extending to the upper electrode, a bias line electrically connected to the upper electrode through the contact hole, a scintillator adapted to convert X-rays to light of a visible wavelength, and a plurality of bias connection lines connected to both ends, respectively, of the bias line for applying a bias voltage to the bias line.

The bias line may include a first bias line and a second bias line formed on the first bias line.

The first bias line may be made of a transparent conductive material, and the second bias line may be made of a low resistance material.

The first bias line may have a wide width in a periphery of the contact hole.

The second bias line may have a wide width in a periphery of the semiconductor that is not covered by the source electrode and the drain electrode.

The first bias line may have a wide width in a periphery of the semiconductor that is not covered by the source electrode and the drain electrode.

The photosensor may be a PIN diode.

According to an embodiment of the present invention an X-ray detector includes a detection unit region that includes a TFT, a photosensor that is connected to the TFT, and a scintillator adapted to convert X-rays to light of a visible wavelength, a gate line and a data line connected to the TFT, a bias line connected to the photosensor, a gate driver connected to the gate line, a reception signal detector connected to the data line, and a plurality of bias connection lines connected to both ends, respectively, of the bias line for applying a bias voltage to the bias line.

The bias line may include a first bias line and a second bias line formed on the first bias line.

The first bias line may be made of a transparent conductive material, and the second bias line may be made of a low resistance material.

The reception signal detector may be electrically connected to the data line by a flexible printed circuit film (FPC film), and the FPC film is connected to a FPC pad, wherein the FPC pad is formed in the substrate.

The FPC film may transfer the bias voltage, collect the bias voltage transferred through two adjacent FPC pads to one location, and apply the bias voltage to the first and second bias connection lines.

The reception signal detector may include first and second reception signal detectors, divide each data line, and allow one data line to transmit a detection signal to the first reception signal detector and the other data line to transmit a detection signal to the second reception signal detector.

The photosensor may be a PIN diode.

By using an X-ray detection panel, X-rays can be detected without a separate film by using a PIN diode and by forming two bias connection lines that connect a bias line to the upside and the downside of the panel, even if the bias line is disconnected, and further, X-rays can be detected without an error. Additionally, by forming a bias line with first and second bias lines, occurrences of disconnection can be reduced.

DETAILED DESCRIPTION OF EMBODIMENTS

Figure 1:
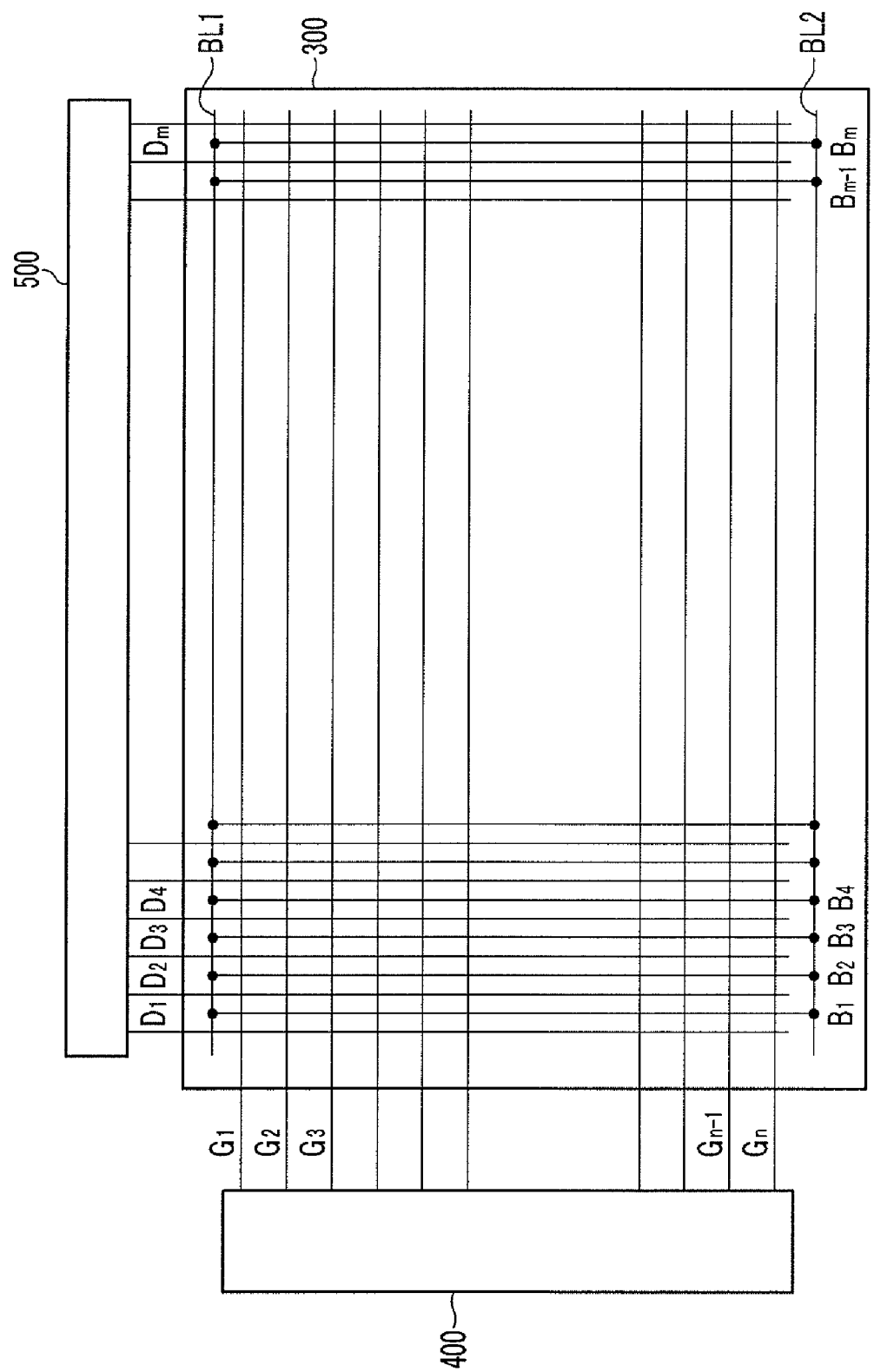
FIG. 1 is a diagram illustrating a structure of an X-ray detector according to an exemplary embodiment of the present invention.

Embodiments of the present invention will be described more fully hereinafter with reference to the accompanying drawings.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

An X-ray detector according to an exemplary embodiment of the present invention is described in detail with reference to FIGS. 1 and 2.

Figure 2:
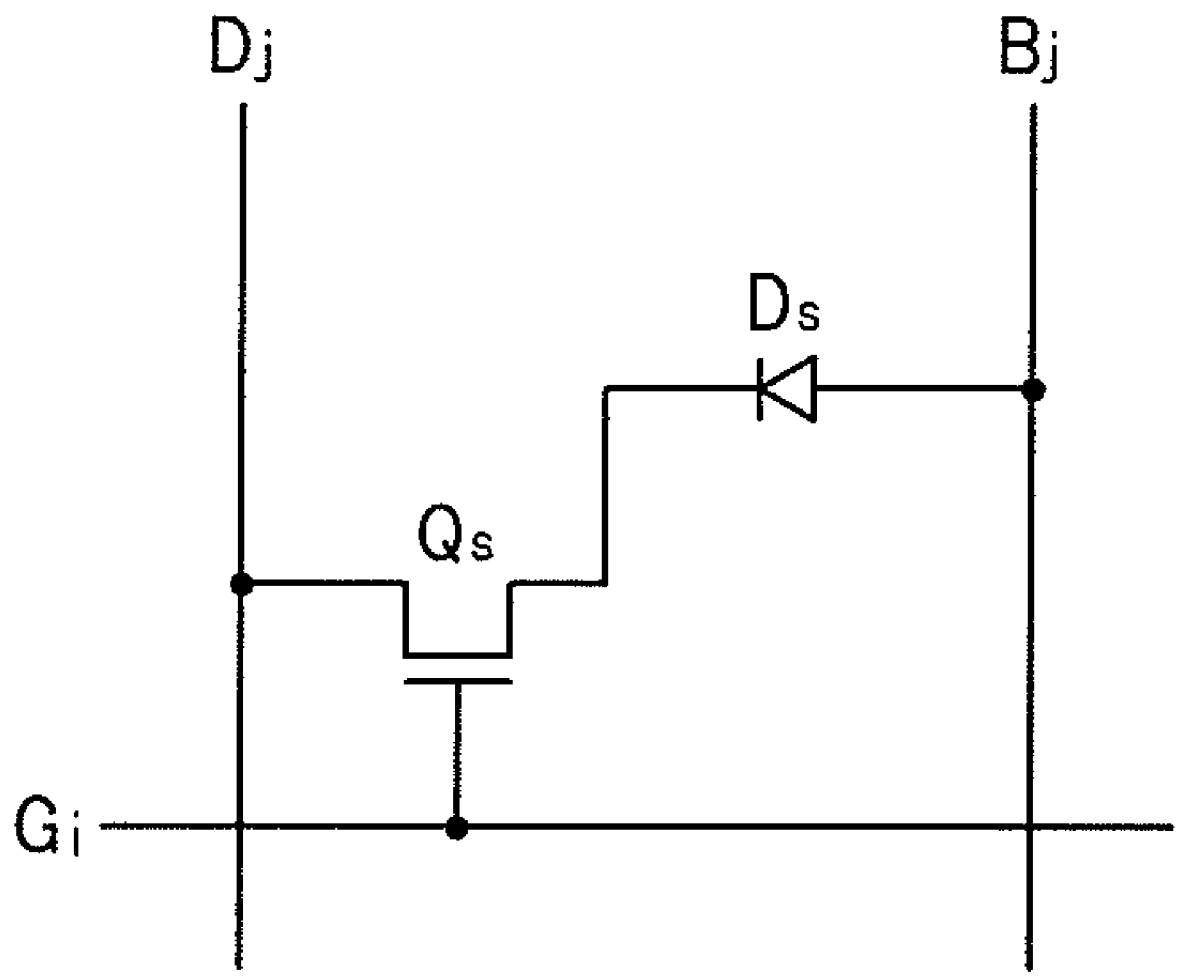
FIG. 2 is an equivalent circuit diagram illustrating a detection unit region of an X-ray detector according to an exemplary embodiment of the present invention.

FIG. 1 is a diagram illustrating a structure of an X-ray detector according to an exemplary embodiment of the present invention, and FIG. 2 is an equivalent circuit diagram illustrating a detection unit region of an X-ray detector according to an exemplary embodiment of the present invention.

As shown in FIG. 1, the X-ray detector includes an X-ray detection panel 300, and a gate driver 400 and a reception signal detector 500 that are connected thereto, and may include a bias power supply unit (not shown) that supplies a bias voltage to a bias line, separately from the reception signal detector 500.

Figure 3:
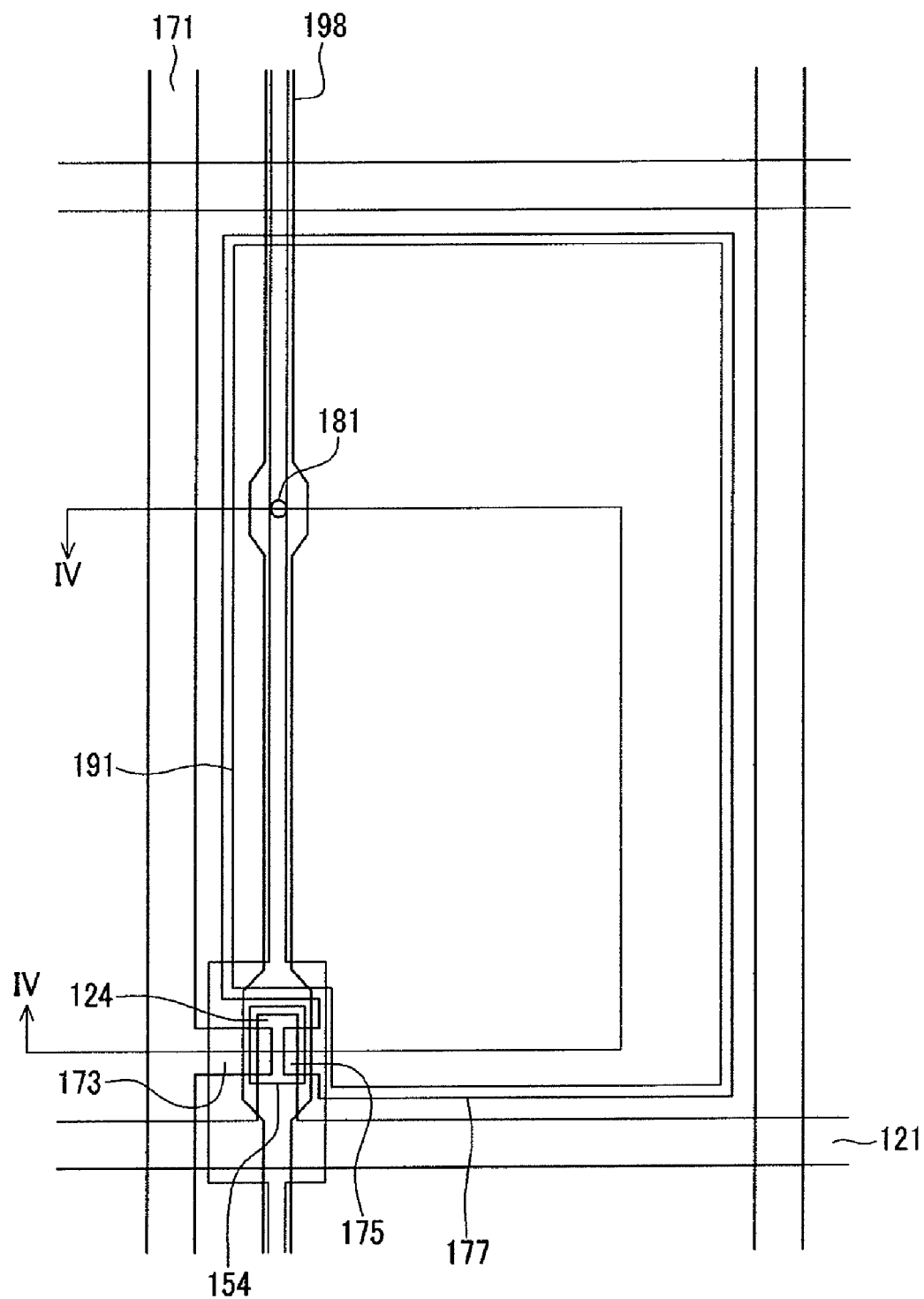
FIG. 3 is a layout view of a detection unit region of an X-ray detector according to an exemplary embodiment of the present invention.
Figure 4:
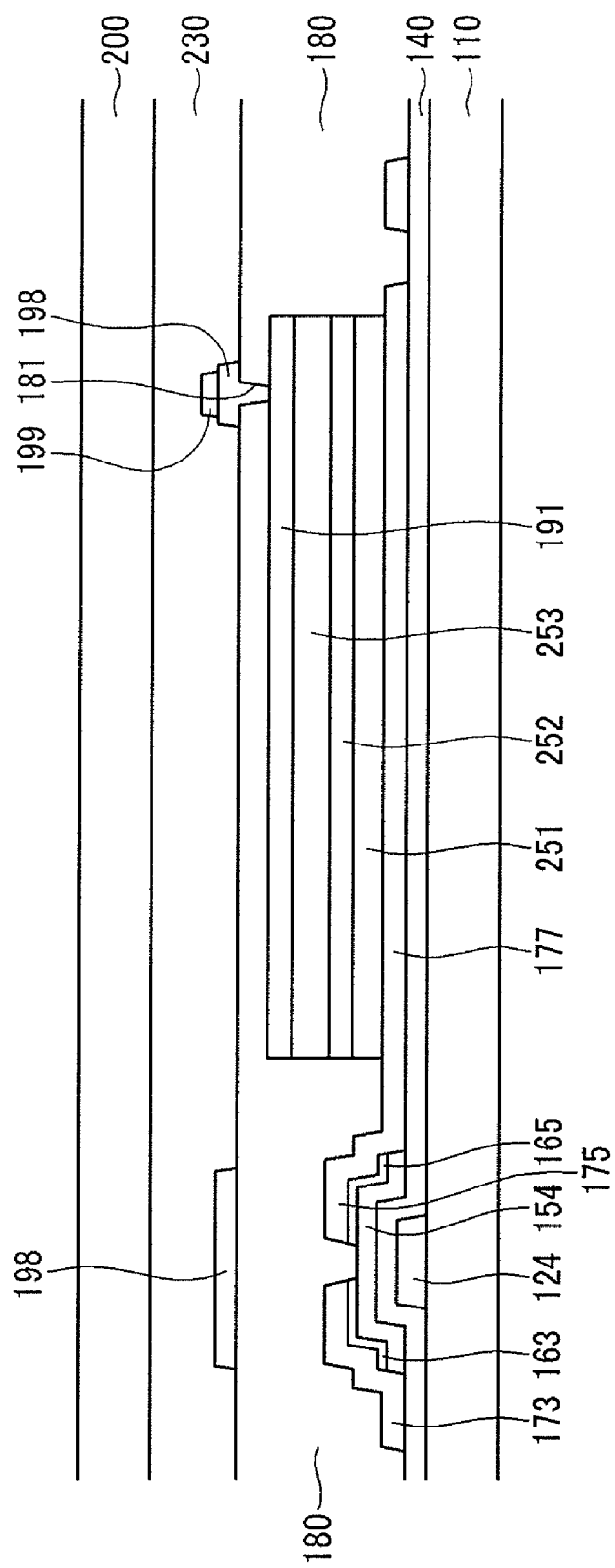
FIG. 4 is a cross-sectional view of a detection unit region of an X-ray detector taken along line IV-IV of FIG. 3.

Referring to FIGS. 1 and 2, the X-ray detection panel 300 includes a plurality of signal lines G1-Gn, D1-Dm, and B1-Bm and a plurality of detection unit regions that are connected thereto and that are arranged in approximately a matrix form. Each detection unit region includes one TFT and one PIN diode (photosensor having a lightly doped intrinsic semiconductor region disposed between p-type and n-type semiconductor regions). An exemplary structure of a detection unit region is shown in FIGS. 3 and 4. Here, each of the PIN diodes performs a function of a sensor for detecting light. A scintillator 230 is positioned at an upper part of the PIN diode and the TFT. The scintillator 230 includes a material that emits light upon a collision of radiation rays thereupon. The scintillator 230 converts X-rays to light of a visible wavelength and emits the visible light when X-rays are applied. The emitted visible light is detected by the PIN diode, which is a photosensor.

The signal lines G1-Gn, D1-Dm, and B1-Bm include a plurality of gate lines G1-Gn that transfer a gate signal (that may be referred to as a "scanning signal"), a plurality of data lines D1-Dm that transfer a signal that is detected by the PIN diode to the reception signal detector 500, and bias lines B1-Bm that apply a bias voltage to each PIN diode. The gate lines G1-Gn extend in approximately a row direction and are substantially parallel to each other, and the data lines D1-Dm and the bias lines B1-Bm extend in approximately a column direction and are substantially parallel to each other. The bias lines B1-Bm include first and second bias connection lines BL1 and BL2 that respectively connect one end of the bias lines B1-Bm at each of an upper side and a lower side of the substrate. The first and second bias connection lines BL1 and BL2 allow a bias voltage to be simultaneously applied from the upper side and the lower side. Even if the bias lines B1-Bm are disconnected, a bias voltage is applied through the second bias connection line BL2 at the downside, and a bias voltage is applied through the first bias connection line BL1 at the upside, based on the disconnected position. Therefore, even if the bias lines B1-Bm are disconnected, only one detection unit region loses detection ability, while in other regions, X-rays can still be detected. Further, if a signal is corrected based on a detected result, X-rays can be analogized in an undetected region and thus X-rays can be detected with the X-ray detection panel. The first and second bias connection lines BL1 and BL2 may be electrically connected to each other by forming a wiring at a right side end (i.e., a side end opposite from the gate driver 400) of a fan-out region of the X-ray detection panel 300, and may be connected to entirely have a loop structure by forming a wiring at a right side end and a left side end (i.e., a side end directly adjacent to the gate driver 400) of the fan-out region in a loop form. According to an exemplary embodiment, by forming a separate bias voltage application point, the first and second bias connection lines BL1 and BL2 may be formed not to be connected through a fan-out region of the X-ray detection panel 300 as described herein.

The gate driver 400 is connected to the gate lines G1-Gn of the X-ray detection panel 300 to apply a gate signal comprising a combination of a gate-on voltage Von and a gate-off voltage Voff to the gate lines G1-Gn. The gate driver 400 sequentially applies a gate-on voltage Von to each of the gate lines G1-Gn and applies a gate-off voltage Voff when the gate-on voltage Von is not applied.

The reception signal detector 500 is connected to the data lines D1-Dm of the X-ray detection panel 300 and performs a function of receiving a signal that is detected by the PIN diode. The reception signal detector 500 collects signals that are detected by the PIN diode for a gate-on time period in a capacitor (not shown) that is connected to an operational (OP) amplifier (not shown), transmits the signals to a shift register (not shown), stores the signals for at least one gate-on time period, transmits the signals to an analog-to-digital (AD) converter (not shown), converts the signals to digital signals, and outputs the digital signals.

A bias power supply unit (not shown) applies a bias voltage to the PIN diode through bias lines B1-Bm of the X-ray detection panel 300. Because one PIN diode is formed in one detection unit region, one bias line is formed in each line.

The PIN diode to which a bias voltage is applied detects X-rays through the conversion of the X-rays to visible light in a scintillator and generates a current. When a bias voltage is not applied, even if visible rays are applied to the PIN diode, the PIN diode does not generate a current and thus the PIN diode does not perform a function as a sensor.

Figure 8:
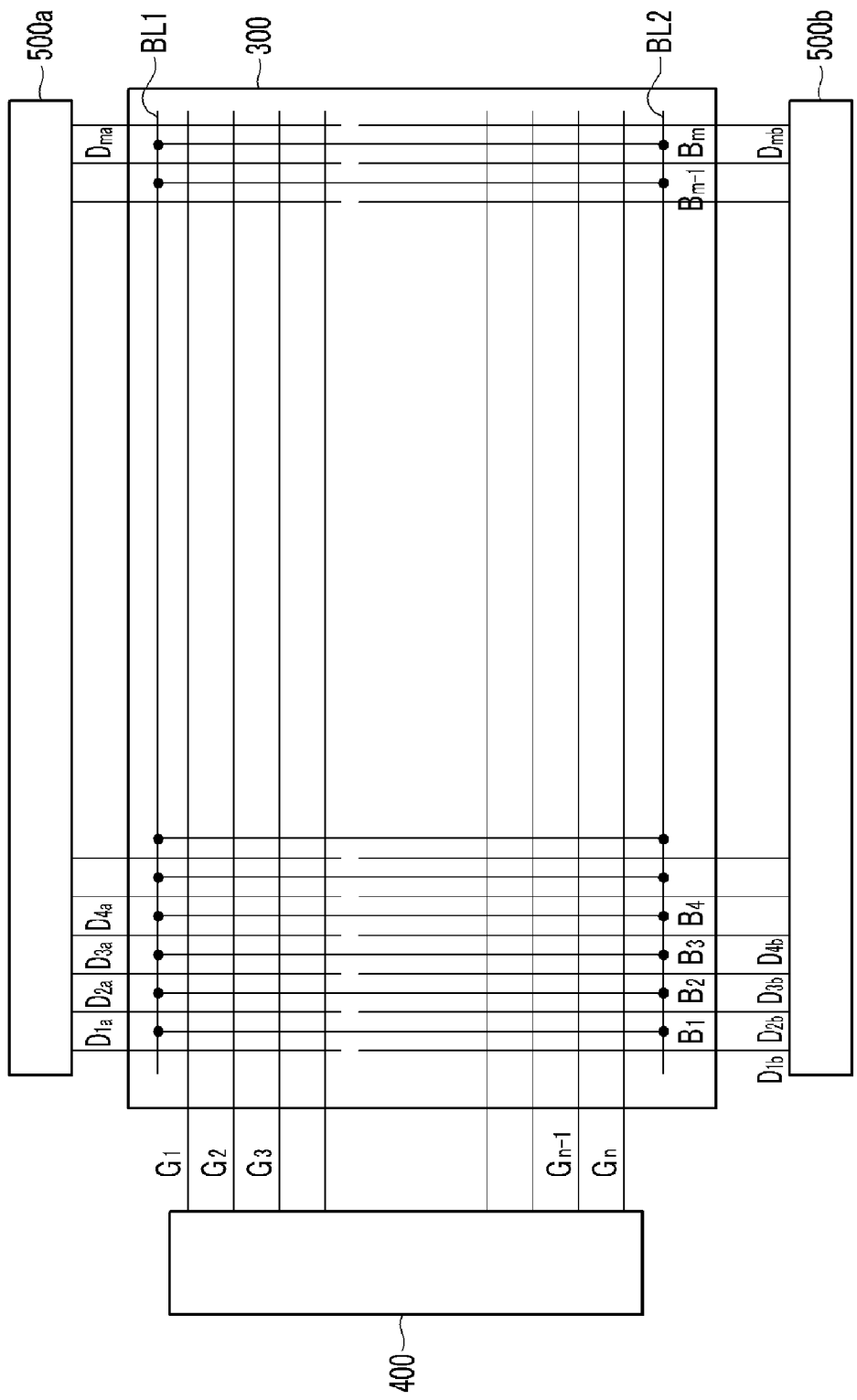
FIG. 8 is a diagram illustrating a structure of an X-ray detector according to an exemplary embodiment of the present invention.

When X-rays are radiated to a still object, a sufficient time period for detecting X-rays can be secured. When X-rays are radiated to a moving object, faster processing for detecting X-rays is needed. In the case of a moving object, as shown in FIG. 8, a structure in which data lines D1-Dm are divided into an upper data line D1a-Dma and a lower data line D1b-Dmb based on a central part, and in which each data line receives data that are sensed by two different reception signal detectors 500a, 500b may be used.

Each of the driving devices 400 and 500 may be directly mounted on the X-ray detection panel 300 in at least one IC chip form, mounted on a FPC film (not shown) to be attached to the X-ray detection panel 300 in a tape carrier package (TCP) form, or mounted on a separate printed circuit board (PCB) (not shown). Alternatively, the driving devices 400 and 500, together with the signal lines G1-Gn, D1-Dm, and B1-Bm and the TFT switching element Q may be integrated with the X-ray detection panel 300. Further, the driving devices 400 and 500 can be integrated in a single chip, and in this case, at least one of them or at least one circuit element constituting them may be disposed external to a single chip.

FIG. 2 is a circuit diagram schematically illustrating one detection unit region.

In each detection unit region, for example, a detection unit region that is connected to an i-th (i=1, 2, ..., n) gate line Gi and a j-th (j=1, 2, ..., m) data line Dj, a switching element Q that is connected to the signal lines Gi and Dj and one PIN diode Ds is connected thereto.

The switching element Qs is a three terminal element of a TFT that is provided in a lower substrate 110, a control terminal thereof is connected to the gate lines G1-Gn, an output terminal thereof is connected to the data lines D1-Dm, and an input terminal thereof is connected to the PIN diode Ds.

The PIN diode Ds is a diode in which a P-type semiconductor, an intrinsic semiconductor, and an N-type semiconductor are sequentially connected and has characteristics of flowing a current in one direction when detecting external light. The PIN diode Ds receives a bias voltage through the bias line Bj to transfer the output to the switching element Qs.

A structure of one detection unit region according to an exemplary embodiment of the present invention is described hereinafter in detail.

FIG. 3 is a layout view of a detection unit region of an X-ray detector according to an exemplary embodiment of the present invention, and FIG. 4 is a cross-sectional view of a detection unit region of an X-ray detector taken along line IV-IV of FIG. 3.

The X-ray detection panel includes a lower substrate 110, an upper substrate 200 that is opposite thereto. TFTs, PIN diodes, and a scintillator 230 are formed between the lower substrate 110 and the upper substrate 200.

A plurality of gate lines 121 is formed on the lower substrate 110. The lower substrate 110 may be made of transparent glass, plastic, etc.

The gate lines 121 transfer a gate signal and extend substantially in a horizontal direction. Each gate line 121 includes a plurality of gate electrodes 124 that are protruded to the upside.

A gate insulating layer 140 is formed on the gate line 121. The gate insulating layer 140 may be made of silicon nitride SiNx or silicon oxide SiOx A plurality of semiconductor islands 154 made of hydrogenated amorphous silicon, polysilicon, etc., is formed on the gate insulating layer 140. The semiconductor 154 may be formed on the gate electrode 124 and formed in a size that can cover an end part of the gate electrode 124.

A plurality of ohmic contacts 163 and 165 are formed on the semiconductor 154. The ohmic contacts 163 and 165 are made of a material such as n+ hydrogenated amorphous silicon, in which n-type impurities such as phosphorus are doped with a high concentration, or are made of silicide.

A plurality of data lines 171 and a plurality of drain electrodes 175 are formed on the ohmic contacts 163 and 165 and the gate insulating layer 140.

The data lines 171 transfer a signal that is detected by the PIN diode and extend substantially in a vertical direction and intersect the gate lines 121. Each data line 171 includes a plurality of source electrodes 173 that extend toward the gate electrode 124.

The drain electrode 175 is separated from the data line 171 and faces the source electrode 173 about the gate electrode 124. Each drain electrode 175 extends to cover a majority of a detection unit region, including a TFT region and a region that is formed apart a predetermined distance from the gate line 121 and the data line 171. A region that is extended from the drain electrode 175 forms a lower electrode 177 of the PIN diode.

One gate electrode 124, one source electrode 173, and one drain electrode 175 together with the semiconductor 154 form one TFT, and a channel of the TFT is formed in the semiconductor 154 between the source electrode 173 and the drain electrode 175.

The ohmic contacts 163 and 165 exist between the lower semiconductor 154 and the upper data line 171 and drain electrode 175, and lower contact resistance therebetween.

Diode semiconductors 251, 252, and 253 are formed on the lower electrode 177 of the PIN diode. The diode semiconductors include an N-type semiconductor 251, an intrinsic semiconductor 252, and a P-type semiconductor 253, respectively, and the PIN diode is formed by sequentially stacking them.

An upper electrode 191 made of a transparent conductive material such as ITO or IZO is formed in an upper part of the P-type semiconductor 253. The upper electrode 191 is formed in a region corresponding to the lower electrode 177 and the diode semiconductors 251, 252, and 253. The upper electrode 191 and the lower electrode 177 may be formed in a region wider than that of the diode semiconductors 251, 252, and 253, and as shown in FIGS. 3 and 4, the upper electrode 191 may be formed to cover a region narrower than that of the lower electrode 177. Alternatively, the upper electrode 191 may be formed to cover a region wider than that of the lower electrode 177.

A passivation layer 180 is formed on the data line 171, the drain electrode 175, and the upper electrode 191 of the exposed semiconductor 153 and the PIN diode. The passivation layer 180 is formed of an inorganic insulator or an organic insulator such as silicon nitride or silicon oxide. The passivation layer 180 may have a dual-layer structure, with each layer made of an inorganic insulator or an organic insulator. A contact hole 181 for extending to each of the upper electrodes 191 is formed in the passivation layer 180.

A first bias line 198 is formed on the passivation layer 180. The first bias line 198 covers the contact hole 181, extends substantially in a vertical direction, intersects the gate line 121, and is substantially parallel to the data line 171. The first bias line 198 is electrically connected to the upper electrode 191 through the contact hole 181. The first bias line 198 is formed to cover a channel portion of a TFT. Therefore, the first bias line 198 has a wide width in a periphery of the contact hole 181 and a periphery of a TFT, as shown in FIG. 3.

In an upper part of the first bias line 198, a second bias line 199 is formed. The second bias line 199 extends in a vertical direction to intersect the gate line 121 and is substantially parallel to the data line 171. The second bias line 199 overlaps with the first bias line 198 and has a width narrower than that of the first bias line 198. Because the second bias line 199 is not connected to the upper electrode 191 through the contact hole 181, the second bias line 199 does not have a wide width in a periphery of the contact hole 181, but because the second bias line 199 has a wide width in a periphery of the TFT, the second bias line 199 substantially prevents light from being applied to a channel of the TFT.

In an exemplary embodiment of the present invention, as described above, two bias lines 198 and 199 may be used. The first bias line 198 may be formed with a transparent conductor such as ITO. The transparent conductor has good contact characteristics with the upper electrode 191 through the contact hole 181. The transparent conductor applies a bias voltage through the second bias line 199 having low resistance by overlapping the second bias lines 199 that are made of molybdenum (Mo), aluminum (Al), or alloys thereof. Further, the transparent conductor substantially prevents light from being applied to a channel of the TFT through the second bias line 199.

According to an exemplary embodiment of the present invention, one bias line may be formed.

A scintillator 230 is formed on the passivation layer 180, and the first and second bias lines 198 and 199.

The scintillator 230 is made of a material that emits light upon a collision of X-ray radiation and converts the X-rays to light of a visible wavelength (e.g., in a green wavelength) and emits the visible light when X-rays are applied. The visible light is applied to the PIN diode to generate a current.

To protect a lower structure, the upper substrate 200 is formed on the scintillator 230.

In the foregoing description, a structure of the X-ray detector and a structure of one detection unit region according to an exemplary embodiment of the present invention were described.

Figure 5:
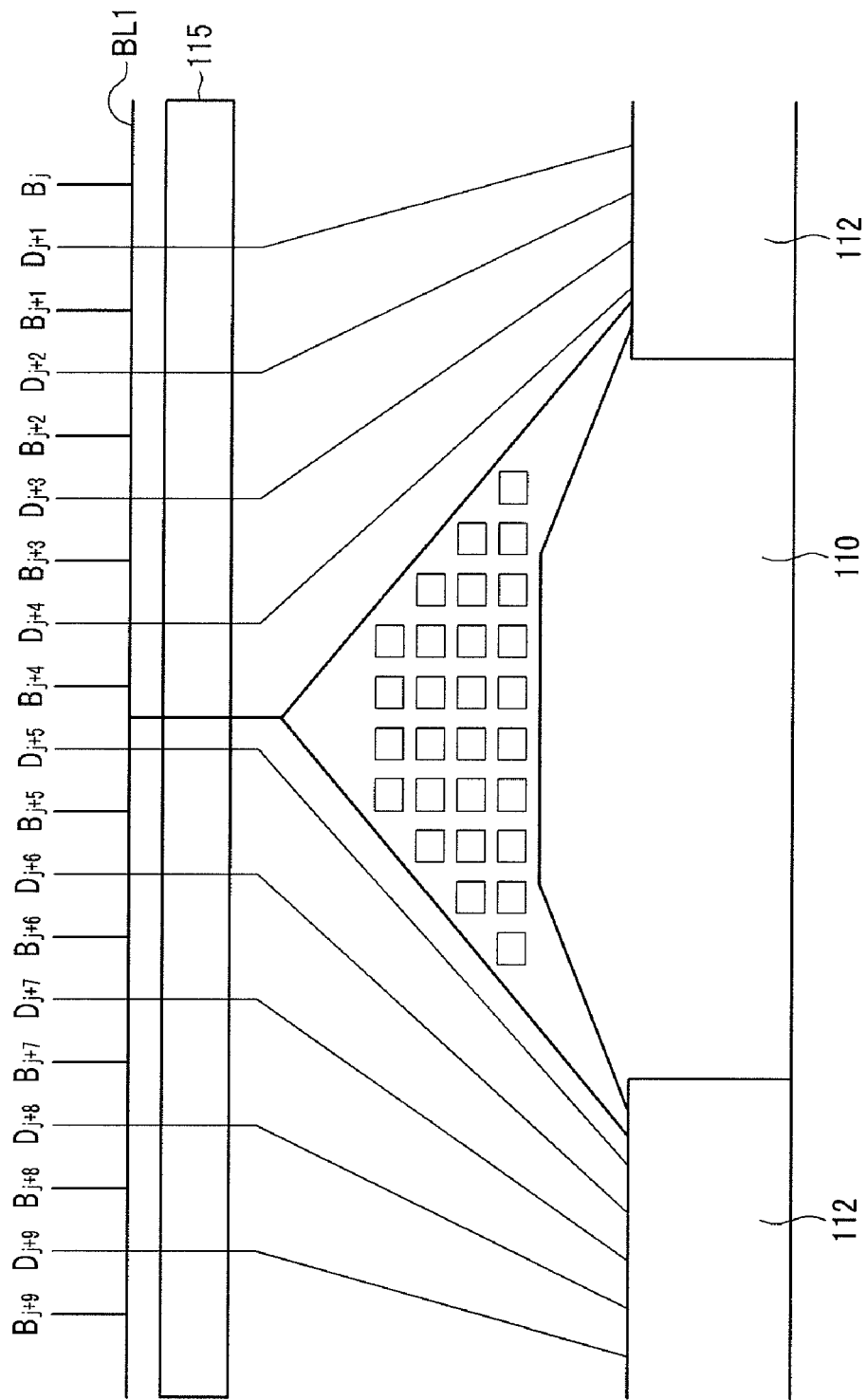
FIG. 5 is an enlarged view of a fan-out region to which a reception signal detector and a bias power supply unit of an X-ray detection panel are attached.

FIG. 5 is an enlarged view of a fan-out region to which a reception signal detector 500 and a bias power supply unit of an X-ray detection panel 300 are attached.

In an exemplary embodiment of FIG. 5, the reception signal detector 500 and the bias power supply unit are formed external to the X-ray detection panel 300 and are connected to the X-ray detection panel 300 through a FPC film.

At least one of the FPC film pads 112 is formed external to a lower substrate of the X-ray detection panel 300. The FPC film pad 112 contacts a part of a FPC film to transfer a signal that is received by the PIN diode to the reception signal detector 500, and applies a bias voltage from the bias power supply unit to the bias lines B1-Bm.

A structure for applying a bias voltage to the bias lines B1-Bm is described; a bias voltage that is input through the FPC film pad 112 is collected at one location and is applied to the first bias connection line BL1. The applied bias voltage is applied to each of the bias lines B1-Bm along the first bias connection line BL1.

Although not shown in FIG. 5, the applied bias voltage is applied to the second bias connection line BL2 and is applied to each of the bias lines B1-Bm through the second bias connection line BL2. The first bias connection line BL1 and the second bias connection line BL2 are connected to each other through the left side end or the right side end of a fan-out region of the X-ray detection panel 300, and a bias voltage that is applied to the first bias connection line BL1 is applied to the second bias connection line BL2. The first and second bias connection lines BL1 and BL2 may be formed not to be connected to each other through a fan-out region. In the case of disconnected first and second bias connection lines BL1 and BL2, a bias voltage application point that is directly connected to the second bias connection line BL2 may be formed.

A static electricity prevention circuit 115 may be formed at the outside of the first bias connection line BL1. The static electricity prevention circuit 115 substantially prevents damage to an entire panel due to static electricity when a high voltage of static electricity occurs in the X-ray detection panel 300. The static electricity prevention circuit 115 may have various structures according to exemplary embodiments, and in FIG. 5, only a position of the static electricity prevention circuit 115 is depicted and a detailed description is omitted.

Figure 6:
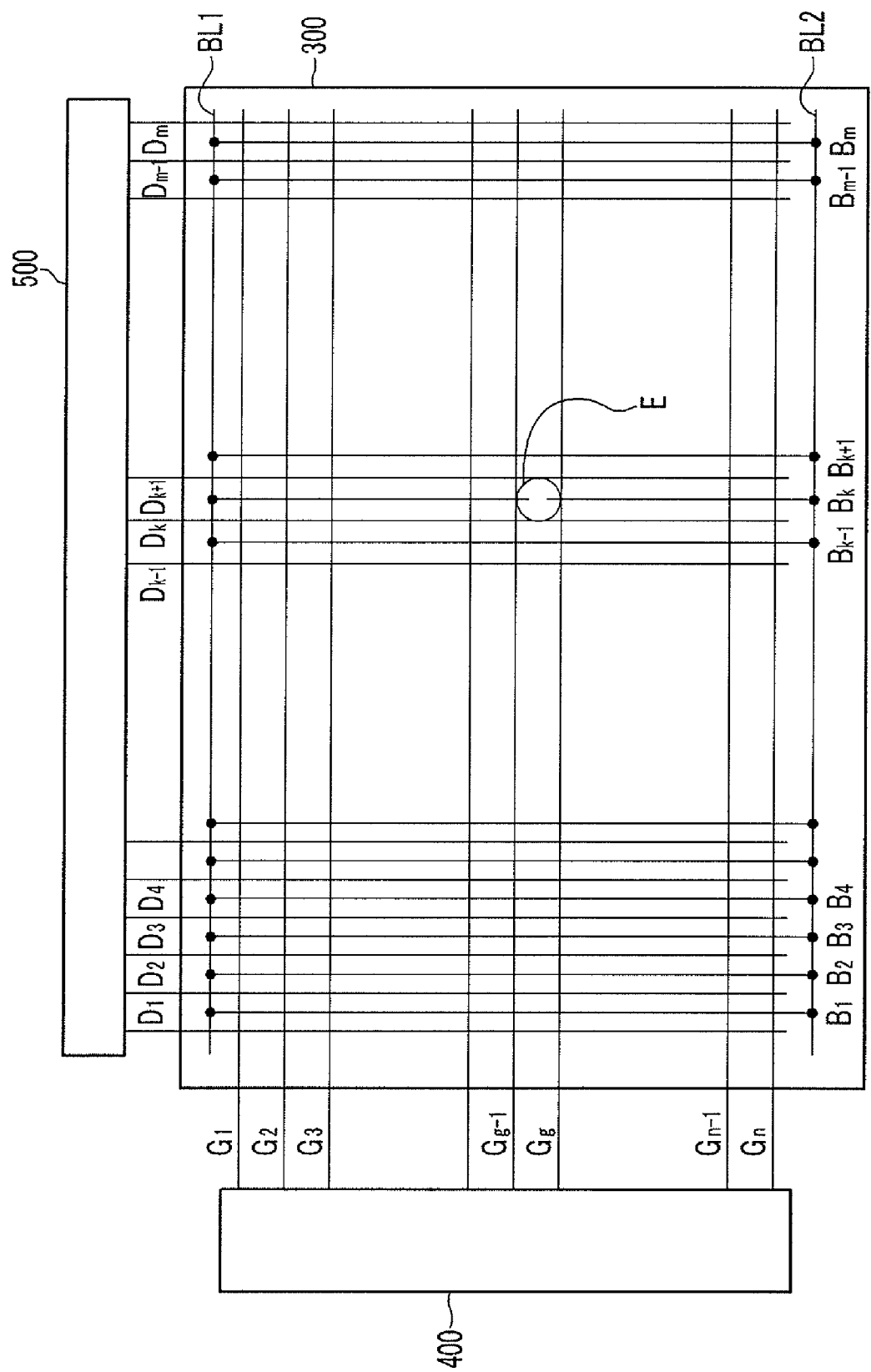
FIG. 6 is a diagram illustrating an X-ray detection panel in which one of the bias lines is disconnected.

FIG. 6 is a diagram illustrating an X-ray detection panel in which one of the bias lines is disconnected.

In a detector unit region (hereinafter, referred to as 'disconnected detection unit region E') that is connected to a g-th gate line Gg, and a k-th data line Dk, and a k-th bias line Bk, an X-ray detection panel in which the k-th bias line Bk is disconnected is shown.

When X-rays are detected using such an X-ray detection panel, X-rays can be detected in other detection unit regions, but X-rays cannot be detected in the disconnected detector unit region E.

In a conventional X-ray detection panel, when a bias voltage is applied from the upper side, X-rays cannot be detected in an entire detection unit region under a disconnected portion. According to an embodiment of the present invention, when a bias voltage is applied from both sides, X-rays cannot be detected only in the disconnected detection unit region E.

Further, according to a disconnected position of the bias line, X-rays can be detected even in the disconnected detection unit region E. That is, although a bias line is disconnected, when a disconnected position is away from a contact hole 181 in which the bias line contacts with the upper electrode 191, a bias voltage can be applied from one side, and thus X-rays can be detected.

Further, if a bias line has a double layer structure of the first bias line 198 and the second bias line 199, only one bias line is disconnected and the other bias line may not be disconnected, and thus the X-ray detection panel is less influenced by disconnection.

Because a bias voltage is applied through the first and second bias connection lines BL1 and BL2 that are formed at both sides, even if a disconnection occurs in the bias lines B1-Bm, a portion of a detection unit region that is connected to the corresponding bias line receives a bias voltage that is applied from both sides, and thus detection unit regions, except for a detection unit region that is formed at the disconnected position, are normally operated.

Further, due to the first and second bias lines 198 and 199 of a double layer structure, a possibility of disconnection is reduced.

Figure 7:
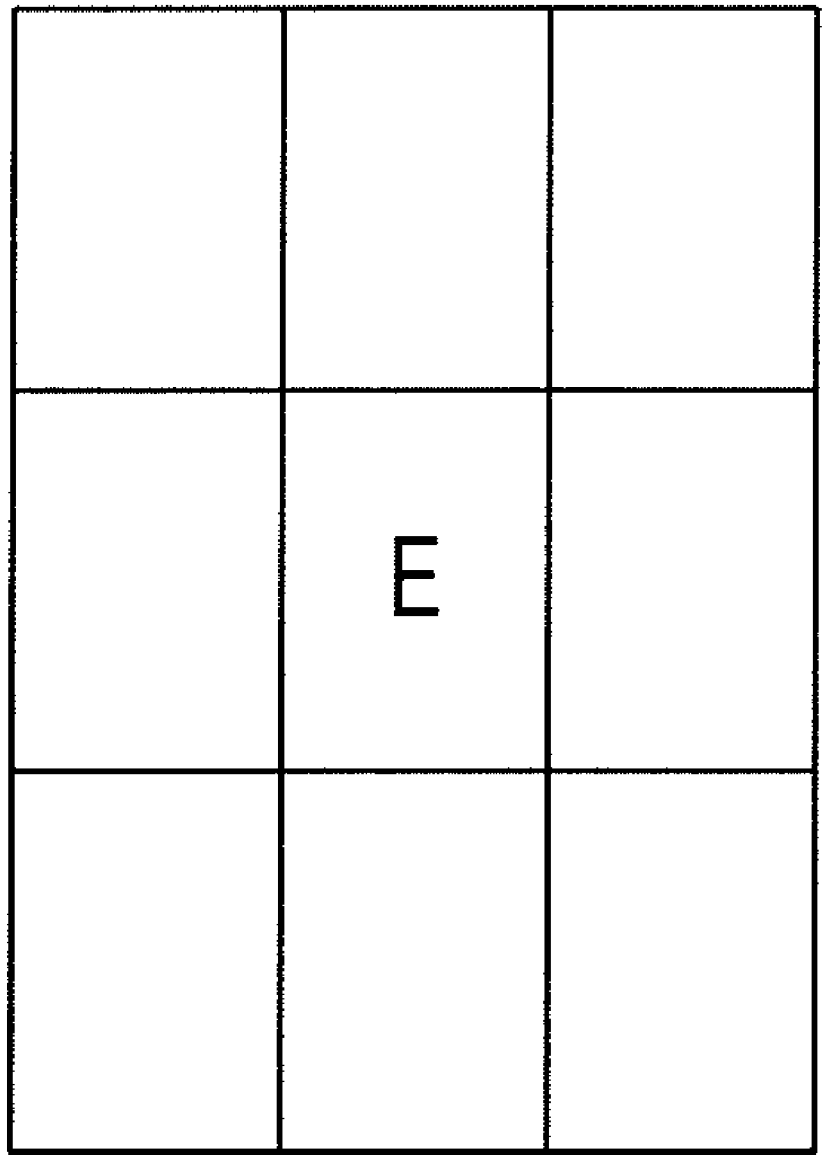
FIG. 7 is a diagram schematically illustrating a disconnected detection unit region and a peripheral detection unit region thereof in an X-ray detection panel.

FIG. 7 is a diagram schematically illustrating a disconnected detection unit region and a detection unit region of a periphery thereof in an X-ray detection panel according to an exemplary embodiment of the present invention.

FIG. 7 shows a case where a disconnected detection unit region E occurs due to disconnection of a bias line. A total of eight normal detection unit regions exist in a periphery of the disconnected detection unit region E. If at least four signals of signals for the normal detection unit regions are applied, the entire detection data can be corrected by generating detection data of the disconnected detection unit region E based on the received signals. This may be an operation that is performed in the reception signal detector 500, and X-rays can be completely detected by correcting such detection data, and a failure of the X-ray detection panel can be ameliorated.

In addition to the above-described method, various correction methods exist, and in these correction methods, in consideration of the change of a detection amount based on detection data of adjacent pixels, a correction is performed.

As described above, because data can be corrected, even if a plurality of disconnected detection unit regions exist, the X-ray detection panel can be used for detecting X-rays.

While the present invention has been described in connection with what is presently considered to be practical exemplary embodiments, it is to be understood that the present invention is not limited to disclosed exemplary embodiments, but, on the contrary, is intended to cover various modifications and equivalent arrangements included within the spirit and scope of the appended claims.

What is claimed is:

1. An X-ray detection panel comprising:
   a substrate;
   a plurality of gate lines that are extended on the substrate in a first direction;
   a plurality of data lines that are extended on the substrate in a second direction, and that are insulated from and intersect the gate lines;
   a plurality of bias lines that are extended on the substrate in the second direction, and that are insulated from and intersect the gate lines and that are substantially parallel to the data lines;
   a detection unit region partitioned by the gate lines and the data lines, the detection unit region comprising a thin film transistor (TFT) and a photosensor;
   a plurality of bias connection lines connected to both ends, respectively, of the plurality of bias lines for applying a bias voltage; and
   a scintillator adapted to convert X-rays to light of a visible wavelength,
   wherein the bias lines include a first bias line and a second bias line formed on the first bias line.

2. The X-ray detection panel of claim 1, wherein the first bias line is made of a transparent conductive material, and the second bias line is made of a low resistance material.

3. The X-ray detection panel of claim 1, wherein the photosensor is a PIN diode.

4. An X-ray detection panel comprising:
   a substrate;
   a plurality of gate lines formed on the substrate and including a gate electrode;
   a gate insulating layer covering the gate lines;
   a semiconductor formed on the gate insulating layer and the gate electrode;
   a plurality of data lines intersecting the gate lines and including a source electrode covering a portion of the semiconductor;
   a lower electrode including a drain electrode disposed opposite to the source electrode and extending from the drain electrode;
   a diode semiconductor formed on the lower electrode;
   an upper electrode formed on the diode semiconductor and made of a transparent conductive material;
   a passivation layer covering the upper electrode and having a contact hole extending to the upper electrode;
   a bias line electrically connected to the upper electrode through the contact hole;
   a scintillator adapted to convert X-rays to light of a visible wavelength; and
   a plurality of bias connection lines connected to both ends, respectively, of the bias line for applying a bias voltage to the bias line.

5. The X-ray detection panel of claim 4, wherein the bias line includes a first bias line and a second bias line formed on the first bias line.

6. The X-ray detection panel of claim 5, wherein the first bias line is made of a transparent conductive material, and the second bias line is made of a low resistance material.

7. The X-ray detection panel of claim 6, wherein the first bias line has a wide width in a periphery of the contact hole.

8. The X-ray detection panel of claim 7, wherein the second bias line has a wide width in a periphery of the semiconductor that is not covered by the source electrode and the drain electrode.

9. The X-ray detection panel of claim 7, wherein the first bias line has a wide width in a periphery of the semiconductor that is not covered by the source electrode and the drain electrode.

10. An X-ray detector comprising:
    a substrate;
    a detection unit region comprising a thin film transistor (TFT) formed on the substrate, a photosensor that is connected to the TFT, and a scintillator adapted to convert X-rays to light of a visible wavelength;
    a gate line connected to the TFT;
    a data line connected to the TFT;
    a bias line connected to the photosensor;
    a gate driver connected to the gate line;
    a reception signal detector connected to the data line; and
    a plurality of bias connection lines connected to both ends, respectively, of the bias line for applying a bias voltage to the bias line,
    wherein the bias line includes a first bias line and a second bias line formed on the first bias line.

11. The X-ray detector of claim 10, wherein the first bias line is made of a transparent conductive material, and the second bias line is made of a low resistance material.

12. The X-ray detector of claim 10, wherein the reception signal detector is electrically connected to the data line by a flexible printed circuit film (FPC film), and the FPC film is connected to a FPC pad, wherein the FPC pad is formed in the substrate.

13. The X-ray detector of claim 12, wherein the FPC film transfers the bias voltage, collects the bias voltage transferred through two adjacent FPC pads to one location, and applies the bias voltage to the first and second bias connection lines.

14. The X-ray detector of claim 10, wherein the reception signal detector includes first and second reception signal detectors, divides each data line, and allows one data line to transmit a detection signal to the first reception signal detector and the other data line to transmit a detection signal to the second reception signal detector.

15. The X-ray detector of claim 10, wherein the photosensor is a PIN diode.

* * * * *